United States Patent [19]

Liao

[11] Patent Number: 5,389,146

[45] Date of Patent: Feb. 14, 1995

[54] GROUTING COMPOSITION AND METHOD

[75] Inventor: Andrew W. Liao, Kingwood, Tex.

[73] Assignee: Baroid Technology, Inc., Houston, Tex.

[21] Appl. No.: 156,097

[22] Filed: Nov. 22, 1993

Related U.S. Application Data

[63] Continuation-in-part of Ser. No. 46,327, Apr. 12, 1993, abandoned.

[51] Int. Cl.$^6$ .............................................. C04B 12/00
[52] U.S. Cl. .............................. 106/811; 106/DIG. 4; 166/292; 405/266; 405/267
[58] Field of Search ................. 405/266, 267; 106/811, 106/DIG. 4; 166/292, 293

[56] References Cited

U.S. PATENT DOCUMENTS

| | | | |
|---|---|---|---|
| 4,463,808 | 8/1984 | Mason et al. | 106/DIG. 4 |
| 4,696,698 | 9/1987 | Harriett | 106/624 |
| 4,696,699 | 9/1987 | Harriett | 405/267 |
| 4,761,183 | 8/1988 | Clarke | 106/624 |
| 4,797,158 | 1/1989 | Harriett | 405/267 |
| 4,886,550 | 12/1989 | Alexander | 405/267 |
| 4,948,428 | 8/1990 | Liao | 106/628 |
| 4,964,918 | 10/1990 | Brown et al. | 106/811 |
| 5,106,423 | 4/1992 | Clarke | 405/266 |
| 5,114,892 | 5/1992 | Clem | 106/DIG. 4 |
| 5,114,893 | 5/1992 | Hughes | 106/DIG. 4 |
| 5,116,413 | 5/1992 | Nooren | 106/DIG. 4 |
| 5,151,126 | 9/1992 | Ranc et al. | 405/266 |

FOREIGN PATENT DOCUMENTS

| | | | |
|---|---|---|---|
| 2516292 | 5/1983 | France | 106/811 |
| 2206574 | 1/1989 | United Kingdom | 106/DIG. 4 |

OTHER PUBLICATIONS

Crowe, Curtis, "Laboratory Study Provides Guidelines For Selecting Clay Stabilizers Paper No. CIM/SPE90-7", Jun. 10-13, 1990, pp. 7-1-7-6.

"Applied Clay Mineralogy" by Ralph E. Grim, pp. 30-32 for cation exchange of water swellable clay, McGraw-Hill Book Co., Inc. New York, 1962. [No Month].

"Shale Stabilization Principles", by L. E. Nesbitt, G. P. King and N. E. Thurber., SPE 14248. (1985) [No Month].

"The Separation of Electrolyte Effects from Rheological Effects in studies of inhibition of Shales with Natural moisture Contents", by—T. W. Beihoffer, D. D. Smith, and D. S. Dorrough., SPE 18032. (1988) [No Month].

"Stabilizing Sensitive Shales with Inhibited, Potassium-Based Drilling Fields", by Dennis E. O'Brien, and Martin E. Chenervert, Journal of Petroleum Technology, Sep., 1973, pp. 1089-1100. [No Month].

Primary Examiner—Anthony Green

[57] ABSTRACT

A grouting composition comprised of (a) 84-95 % by weight of granular water-swellable sodium-based bentonite, (b) 1-8 % by weight of finely divided salt-water hydratable sepiolite, and (c) 4-8% by weight of a clay stabilizer. The grout composition which contains no organic polymeric substances is mixed with fresh water to provide a pumpable, rehydratable, and easily applied grouting slurry. The slurry admixture will form a solid seal with low hydraulic conductivity and high structural stability. The grouting composition is useful for sealing the annular space around a well casing and plugging abandoned wells in practically all types of formations. A preferred grouting compostion comprises 88-90% by weight of granular sodium bentonite, 6-7% by weight of sepiolite, and 4-5% by weight of granular ammonium sulfate. In use, 50 pounds of the preferred grouting compostion is mixed with 13-14 gallons of fresh water directly to provide a grouting slurry with a total of 30-32% by weight of active solids and a density of 10.1-10.3 pounds per gallon. The slurry admixture is a completely inorganic, non-toxic, and environmentally safe grouting system.

5 Claims, 2 Drawing Sheets

GROUTING COMPOSITION AND METHOD

RELATED APPLICATION

This application is a continuation-in-part of U.S. application Ser. No. 08/046,327, filed Apr. 12, 1993, and now abandoned.

FIELD OF THE INVENTION

The present invention relates, generally, to a grouting composition and, particularly, to a grouting composition containing no organic polymeric substances for use in grouting conduits such as casing, tubing and the like in boreholes.

BACKGROUND OF THE INVENTION

Grouting is the placement of a suitable, low hydraulic conductivity material into the annular space between the well casing and borehole, or between the existing casing and liner pipe. The main purposes of grouting and sealing a well are to (1) restore the earth formation outside the casing to its original condition, (2) prevent seepage of polluted surface water downwardly along the exterior of the casing into the well, (3) stabilize and secure the well casing, and (4) preserve the hydraulic characteristics of artesian formations and prevent leakage upwardly along the exterior of the casing. Basically there are three types of grouting material which can be used to serve these purposes. They are (1) cement-based, grouting materials, (2) bentonite-based grouting compositions, and (3) geological materials such as glacial till and sandstone. A suitable grouting material should be able to provide a good seal having both low hydraulic conductivity and high structural stability under most geological conditions. Bentonite-based grouting compositions are known to exhibit low permeability and high swelling capability as compared to cement-based grouting materials. In bentonite-based compositions, the degree of impermeability to aqueous solutions with low salinity is directly related to not only the amount of bentonitic clay, but also to the quality of the clay. For example, sodium-based bentonite or sodium montmorillonite has a much higher swelling pressure than calcium-based bentonite. Because of its high swelling capability, sodium montmorillonite clay particles, when in contact with water, swell immediately and expand the clay lattice. Therefore, the grouting compositions which contain high sodium-based bentonite without addition of a clay thinner or dispersant in either direct or indirect manner tend to stick together and become lumpy when the composition is added to fresh water. The resultant slurry becomes excessively viscous and too thick to pump. This is particularly the problem for those finely divided sodium montmorillonite particles with particle size distribution below 75 micrometers (200 mesh sieve). Such a thick slurry having a very short working time or set time will not only clog pumping equipment, but will also impede the well grouting operation.

U.S. Pat. No. 4,964,918, to Richard K. Brown et al. describes a grouting composition containing 98–99.9% of finely divided, water swellable, colloidal clay such as bentonite, and 0.1–2% of a synthetic organic polymer, polyacrylate, used as a clay thinner. The grouting composition can be added directly into freshwater to provide a grout admixture having 30–35% reswellable solids. A clay thinner can be simply a deflocculant which dissociates clay aggregates physically to reduce slurry viscosity and increase fluidity. The particular thinner disclosed in the '918 patent is an anionic organic polymeric compound containing highly negatived charged sites which prevent clay particles having a net negative charge from associating with each other, thus making the grouting slurry thinner.

U.S. Pat. No. 4,964,918 to Richard K. Brown et al. further teaches that the water swellable clay should be finely ground, wherein at least 80% passes a 200 mesh U.S. Standard sieve. Their grouting composition, made up with finely divided water swellable clay particles, is more likely to provide a thicker slurry when added to freshwater. The finer or smaller the clay particles are, the more surface area is accessible to water adsorption, and the thicker the resultant slurry becomes.

U.S. Pat. No. 4,948,428 to Andrew W. Liao describes a grouting composition comprised of a water swellable granular bentonitic clay and an aqueous admixture containing a hectoride, an alkaline metal tetraborate, an alkaline metal carbonate, and an alkaline metal chloride, wherein the inorganic mixture functions as a clay dispersant. This process requires two separate steps to prepare the grouting slurry from the disclosed grouting compositions. The inorganic mixture is first added to fresh water to prepare an aqueous clay dispersion solution; then granular sodium bentonite is mixed with the dispersion solution to provide a high strength grout slurry.

U.S. Pat. No. 4,696,698 to Todd D. Harriett describes grouting compositions containing up to 80% non-swelling particulate fillers such as fly ash, diatomaceous earth or calcium-based clays, as well as up to 35% gelling agents such as magnesium oxide or soda ash and up to 35% multivalent cation source and as an option, uses sodium pyrophosphate as a clay dispersant.

U.S. Pat. No. 4,463,808 to Carl E. Mason et al. describes a grouting composition in which granular sodium-based bentonite is added to a premixed organic polymer solution containing water dispersable partially hydrolyzed polyacrylamide synthetic polymer known as PHPA. This polymer retards granular bentonite clay particles from swelling and allows the grouting slurry thus produced to be placed at the desired location in the well borehole. Because of growing environmental concerns, use of the grouting materials containing synthetic organic polymers and sulfonated polymers of some aromatic compounds have become less acceptable in many areas of the world.

OBJECTS OF THE INVENTION

The primary object of the present invention is to provide an inorganic, non-toxic, environmentally acceptable grouting composition.

Another object of the present invention is to provide a single step grouting composition, wherein the grouting composition is mixed directly with freshwater.

Still another object of the invention is to provide an improved grouting composition having low permeability, even in the presence of an elevated temperature and saline environment.

Yet another object of the present invention is to provide an improved grouting composition requiring neither a weighing agent to increase the density nor a flocculating agent to flocculate the clay particles in the composition.

It is yet another object of the present invention to provide an easily prepared, one part, organic polymer free, water mixable grouting composition to yield an easily pumped and readily placed grouting slurry with characteristics of low hydraulic conductivity and high structural stability.

Still a further object of the present invention is to provide a grouting slurry that contains a high content of all active, swellable solids without an inactive filler, that are dispersed in water by a selective inorganic clay stabilizer.

Another object of the present invention is to provide a new and improved method of grouting a conduit in an earth borehole.

SUMMARY OF THE INVENTION

The objects, features and advantages of the present invention are accomplished, generally, by the provision of a grouting composition comprising 84-95% by weight of a water swellable clay, 1-8% by weight of sepiolite and 4-8% by weight of a clay stabilizer.

An additional feature of the present invention comprises the clay being in the form of particles having a particle size distribution ranging from 150 micrometers to 600 micrometers.

Yet another feature of the invention comprises the method of grouting a conduit in an earth borehole which comprises the adding of the above-described grouting composition to fresh water, agitating the admixture, and pumping the admixture into the annular space between the conduit and the earth borehole wall.

DETAILED DESCRIPTION OF THE DRAWINGS

DETAILED DESCRIPTION OF PREFERRED EMBODIMENTS

Figure 1:
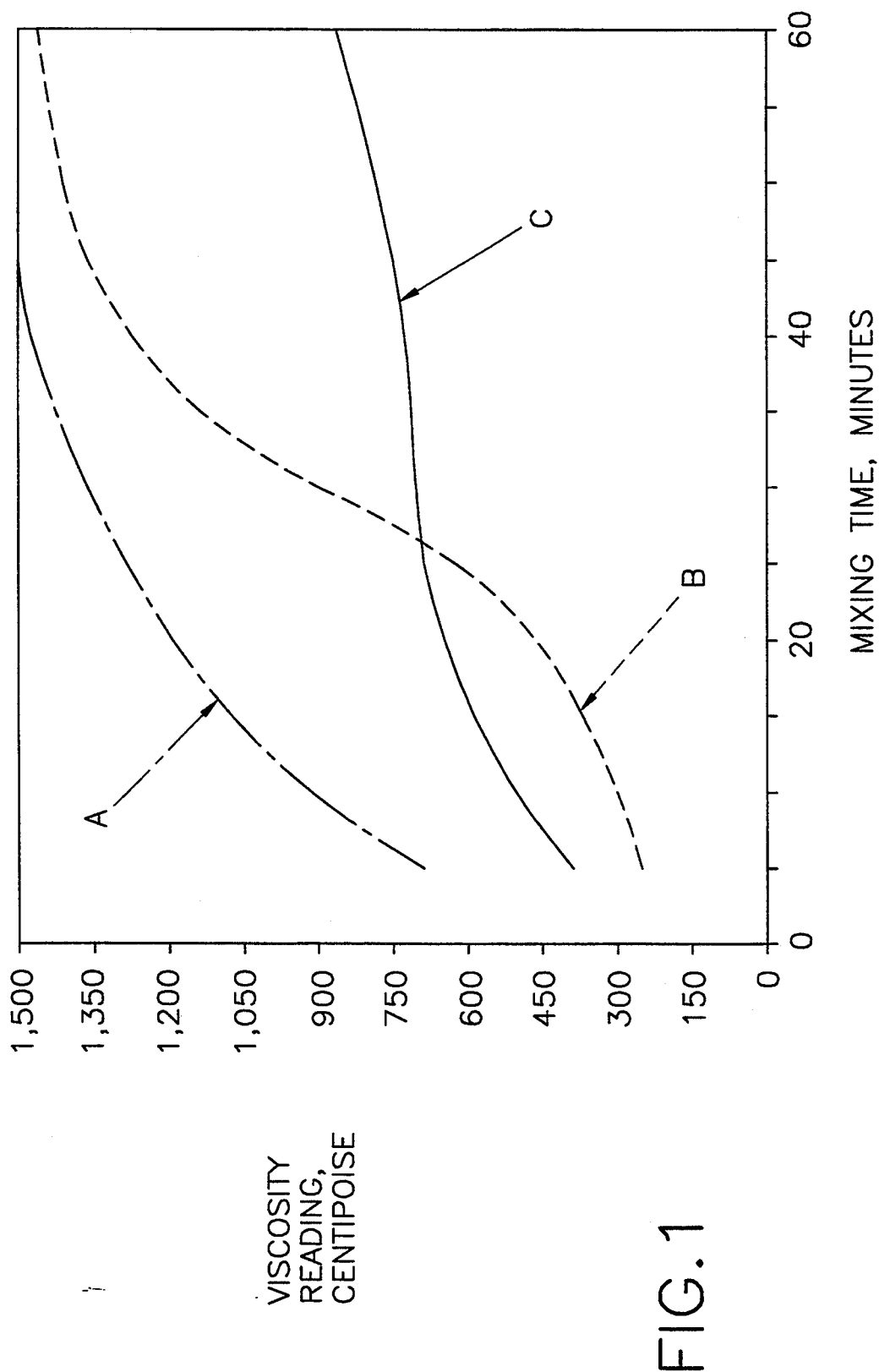
FIG. 1 illustrates graphically the slurry viscosity profile (viscosity vs. time) of a pair of prior art slurries and of a slurry according to the present invention.

The preferred grouting composition of the present invention comprises (1) a water swellable sodium-based bentonite in an amount of 88 to 90% by weight, (2) a salt water swellable sepiolite clay in an amount of 6 to 7% by weight, and (3) an inorganic clay stabilizer, such as ammonium sulfate, in an amount of 4 to 5% by weight. Neither non-swellable fillers, such as cement or fly ash, nor any flocculating agents are added to the grouting composition. One 50-pound sack of this composition is mixed directly with 13 to 14 gallons fresh water to provide a slurry containing a total active or swellable solids of 30 to 32% by weight, and having a specific gravity of 1.21 to 1.24 or a density of 10.1 to 10.3 pounds per gallon. The grouting slurry of the present invention is used, for example, for grouting the annular space between the casing and borehole wall, and for sealing-/isolating the formation/aquifer in the abandonment of a well. Furthermore, the composition of the present invention is also used as a flexible, low hydraulic conductivity back filling and plugging material for use in cementing the conduit and cables in subsurface trenches or boreholes.

The preferred water swellable clay in the composition is sodium-based bentonite containing at least 85% sodium montmorillonite and having methylene blue capacity (MBC) value of above 70 milliequivalent per 100 gram of clay. MBC value is determined by the procedure recommended by the American Petroleum Institute (API): API Recommended Practice 131 (RP 131) Section 9 for Methylene Blue Capacity of Commercial Bentonite. The preferred clay particle size distribution or the water swellable clay in the composition should be in a specific range of 150 micrometer to 600 micrometer, thus being collected between 30 mesh and 100 mesh U.S. standard sieves. A finely ground sodium bentonite, for example, with particle size below 75 micrometer or small enough to pass through a 200 mesh sieve, substituted for the granular bentonite in the composition, results in a grouting slurry that becomes excessively viscous and has a short working time. Selection of the optimum clay particle size of sodium bentonite clay in the composition is depicted in one of the following examples.

In forming the grouting composition of the present invention, the water swellable clay described above is combined with a salt water swellable clay and a clay stabilizer. The preferred salt water hydratable clay is a finely divided sepiolite. Sepiolite is a hydrated magnesium silicate that contains less substituted aluminum than does attapulgite, which it closely resembles. Sepiolite occurs in fibrous and elongated pathlike shapes. When placed in fresh water, sepiolite does not swell like bentonite; however, sepiolite develops a stable suspension which results from the random structure that entraps water and from the large surface area available for adsorption of the polar water molecules. The stable suspension will aid in suspending excess solids in the slurry. Unlike sodium bentonite, sepiolite hydrates in salt solutions. Incorporating sepiolite in the composition increases the grouting slurry suspension capability and ensures grout structural stability, particularly in an elevated saline environment such as seawater or a high concentration of salt water contamination.

In the absence of a clay thinner or stabilizer, a dry montmorillonite clay particle swells immediately when contacted with fresh water. The dry clay particle usually imbibes water molecules and becomes a gel first and then yields a suspension. The montmorillonite clay first takes up one to four monolayers of water between the layers. The interlayer swelling or crystalline swelling causes, at most, a doubling of the volume of the dry clay. However, the swelling process continues, and an amount of water is imbibed which is many times the volume of the original clay. The additional swelling is a result of the double-layer repulsion between the surface of the individual particles, which pushes them apart. This additional swelling is called osmotic swelling since the water tends to equalize the high concentration of ions between two particles, which are so close together that thin double layers overlap, and results in a low concentration of ions far away from the surface in the bulk solution. Both crystalline and osmotic swelling account for the large hydration energy of montmorillonite particles when in contact with fresh water. One way to reduce the hydration energy is to introduce certain cations from other sources in the solution to exchange the compensating cations on the clay layer surfaces. A clay stabilizer provides such cations for reducing clay hydration energy through the cation exchange mechanism. The exchangeable cations of montmorillonite are located on each side of the layers in the clay stack; hence, they are not only on the external surfaces of the particle but also in between the layers. Their presence causes a slight increase of the basal spacing as compared with that of pyrophyllite from 9.1 A (angstron) to 9.6 A. Cations such as ammonium ($NH_4^+$) or potassium ($K^+$) derived from a clay stabilizer can reduce the spacing significantly after being exchanged with those of montmorillonite, which results in reducing clay hydration energy and limiting the swelling of montmorillonite clay lattices. Therefore, more montmorillonite clay particles can be added into a finite volume of fresh water to increase total active swellable solids in the slurry. The preferred clay stabilizer in the composition of the present invention is a granular ammonium sulfate. Not all ammonium salts or potassium salts are suitable as a clay stabilizer in the grouting composition of the present invention. Selection of the clay stabilizer for use in the composition is further illustrated in the Example 4.

As noted above, the grouting composition of the present invention consists of three components, two naturally occurring clays and one inorganic clay stabilizer. However, the preferred weight percentage distribution among these three components is thoroughly optimized by an experimental design process which is also illustrated in the Example 1.

The slurry produced by the grouting composition in the present invention exhibits a distinct viscosity profile as a function of mixing time as shown in FIG. 1. The viscosity profile of the slurry from the composition in the present invention shows a lower and flatter profile than that of the prior art, which provides a pumpable grouting slurry with an extended working time. FIG. 1 compares in its graph A a plot of mixing time (minutes) versus a viscosity reading (centipoise) for a prior art composition in accord with U.S. Pat. No. 4,964,918 to Richard K. Brown et al, in which there are 30% solids. In its graph B, mixing time (minutes) is plotted versus the viscosity reading (centipoise) for a second prior art composition in accord with U.S. Pat. No. 4,948,428 to Andrew W. Liao, in which these are 24% solids. Graph C plots mixing time (minutes) versus the viscosity reading (centipoise) for the composition in accord with the present invention, in which they are 30% solids.

To more fully illustrate the present invention, the following non-limiting examples are presented.

EXAMPLE 1

Figure 2:
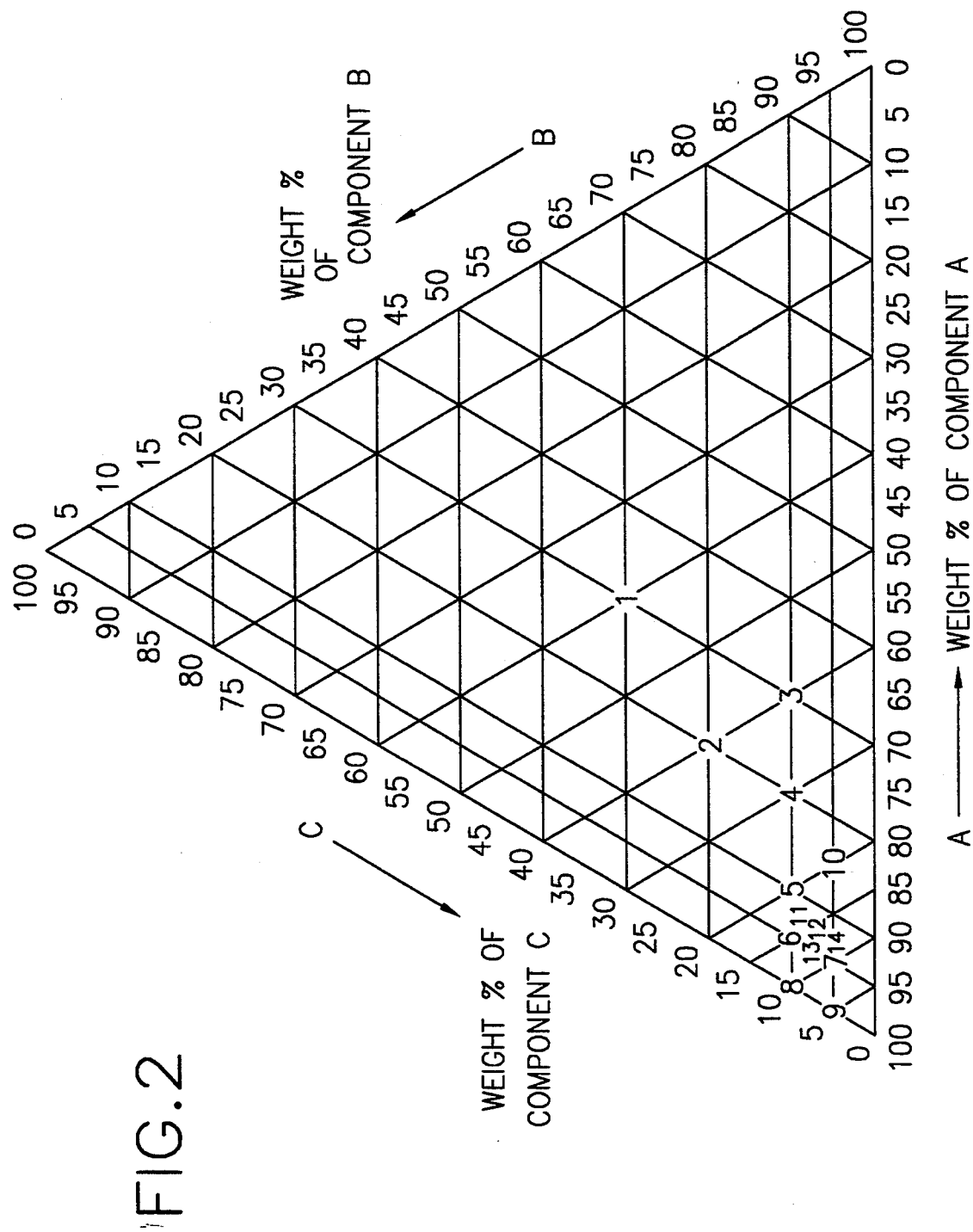
FIG. 2 illustrates graphically the optimization of the weight percent of the three major components of the grouting composition according to the present invention.

The grouting composition of the present invention was prepared by blending the three components in their solid form uniformly. The total weight percentage of the composition should be equal to 100% by adding the percent by weight of each component. These three components as described previously are (1) a granular sodium-based bentonite as component A, (2) a finely divided sepiolite as component B, and (3) a granular ammonium sulfate as component C, and hereafter, referred to as components A, B, and C respectively. An optimization of the composition was conducted using a triangular co-ordinate experimental design as shown in FIG. 2 to select the most appropriate weight percent distribution of the three components for the grouting composition to provide the grouting slurry with desirable characteristics. In FIG. 2, each reference point represents one grouting composition with varying weight percent distribution of the three components, however, their sum should always equal 100%. For example, the reference point #1 with the weight percent distribution of the three components as 40%(A): 30%(B): 30%(C), while the reference point #14 has that of distribution as 88%(A): 7%(B): 5%(C). A total of fourteen formulations were scrutinized before the optimum weight percent range of each component was determined for the preferred grouting composition. The fourteen (14) reference points positioned at their corresponding co-ordinates are shown in FIG. 2.

An aqueous slurry of each composition was prepared by adding 35.7 pounds of each admixture to 10 gallons of fresh water with moderate shear to provide a slurry with 30% total solids. The pumpable slurry was then subjected to performance evaluation. The performance evaluation of the slurries with varying formulations was measured using the following criteria:

1. Viscosity profile as a function of mixing time, $R_1$: This profile was obtained by measuring slurry viscosity from a 300 rpm reading of a FANN Model 35A viscometer equipped with a five(5) multiple torsion spring at the time in minutes after mixing of grouting compositions.
2. Shear strength profile as a function of mixing time, $R_2$: This profile was obtained by determining slurry shear strength in pound per 100 square feet (lb/100 ft 2) by a shearometer at the time in days after mixing of grouting compositions.
3. Visual observation during mixing of grouting compositions, $R_3$: During mixing of dry admixture with fresh water, the resultant slurry was observed for consistency, i.e., either fluid-like (too thin) or solid mass (too viscous), and appearance, i.e., either separation of liquid from solid phase or air bubbles entrapment. A slurry exhibiting either extreme of these two phenomena can cause problems, such as plugging pumps caused by water swellable clay not being able to disperse efficiently, and lost circulation resulting from a fluid-like, thin grout slurry.

Viscosity profile criterion is used to estimate an extension of working time and to predict pumpability of a grout slurry. Experiences learned from well grouting applications indicate the viscosity profile of an applicable grout slurry should fall somewhere between the upper and the lower limits of the viscosity profile, as indicated in Table 1. The upper and lower limit profiles were pre-established from many case studies. If a grout slurry exhibits a high viscosity profile above the upper limit established, it tends to be viscous and set prematurely with a short work time period. However, when the viscosity profile of a grout slurry falls below the lower limit, the grout slurry appears fluid-like and is not able to set in time to provide some structural stability before the slurry is lost to the formation.

Shear strength criterion is used to predict grout structure stability after the slurry is cured. Only a minimum shear strength profile as indicated in Table 1 is needed for the evaluation. Almost without exception a grout slurry exhibiting a viscosity profile below the lower limit will meet the minimum requirement of the shear strength profile. Table 1 lists the detail of the three evaluation criteria.

These three criteria were applied to evaluate a total of fourteen formulations of the grouting composition as listed in Table 2. These fourteen formulations with varying weight percent distributions of the three components of the grouting composition are illustrated in FIG. 2.

Table 2 summarizes the performance evaluation of the grout slurries by viscosity profile as a function of mixing time.

Table 3 summarizes the performance evaluation of the grout slurries by shear strength profile as a function of curing time.

Table 4 summarizes the overall evaluation results of the fourteen grout slurries by all three criteria.

The results in Table 4 indicate that among these fourteen formulations, only two, #14 and #7, pass all three criteria. The component weight distributions of the grout #14—88%(A): 7%(B): 5%(C), and the grout #7—90%(A): 5%(B): 5%(C) become the preferred weight percent range of each component in the grouting composition of the present invention, resulting from the optimization process. However, the applicable weight percent range of each component in the grouting composition should also cover that of grouts #10 and #13. FIG. 2 shows all four grout formulations, i.e., #7, #14, #10, and #13 are located at the lower left hand corner of the triangular co-ordinate. Their percent weight distributions of the three components are covered in the present invention.

EXAMPLE 2

A $2^3$ full factorial experimental design was performed to study the total effect, which includes primary and secondary effects of each component in the grouting composition of the present invention on viscosity and shear strength of the grout slurry. Table 5 lists eight (8) combinations of the three components in their high (+) and low (−) weight percent ranges. Column 11 in Table 5 shows the relative coefficient which indicates the degree of influence on the slurry viscosity from a single component (primary effect) and a joint effect from multiple components. (secondary effect). The higher the negative coefficient, the stronger the effect of reducing viscosity of the grout slurry. Undoubtedly, the high negative coefficient of component C indicates that the ammonium sulfate in the composition has a predominant effect of thinning the slurry. The negative effect on slurry shear strength from component C is also revealed in column 12 of Table 5. Both component A (water-swellable clay) and component B (salt-water hydratable clay) have thickening effects on the grout slurry.

EXAMPLE 3

The sealing capability of the grouting composition of the present invention was measured by hydraulic conductivity (coefficient of permeability). The procedure involves placement of a two-inch grout slurry, without any additional compaction, in a fixed wall cell such as an API standard filter cell with a cross-sectional area of 47.4 cm$^2$, followed by saturation with fresh water overnight before a permeant fluid was drawn into the test cell under pressure. The cell was pressurized at a constant pressure of 10 psi (equivalent to 23 feet water head). The hydraulic gradient, defined as head pressure divided by the thickness of the test sample, equals 138 in the present experiment. The permeant, such as tap water, seeping through the grout slurry in the cell was collected and read over a definite time interval, i.e., every 24 hours. The hydraulic conductivity expressed in cm/sec was calculated based upon Darcy's law. Table 6 lists hydraulic conductivities of the grouting composition of the present invention during 32 days of testing.

EXAMPLE 4

Although both ammonium and potassium salts are used as clay stabilizers, they affect swelling characteristics of sodium montmorillonite clay lattice differently due to the ionic nature of both cations and their counterpart anions in solution. A series of ammonium and potassium salts were screened to select the best clay stabilizer for the grouting composition in the present invention. Table 7 lists the grout slurry performance evaluation of various grouting compositions which vary only in the kind of clay stabilizer and not the quantity used in the formulations. Granular ammonium sulfate appeared to be the best choice of the clay stabilizer for the grouting composition.

EXAMPLE 5

As mentioned in the previous section, not only the quality of sodium bentonite clay but also the clay particle size distribution strongly affects the grout slurry characteristics such as slurry viscosity and shear strength. Five (5) clay particle distribution groups ranging from less than 200-mesh size (75 micrometer) to 8-mesh size (2.36 millimeter) were investigated for the optimum clay particle distribution range for the grouting composition of the present invention. Table 8 illustrates the effect of the clay particle size on the grout slurry performance evaluation. The preferred optimum clay particle size distribution of water swellable sodium bentonite in the grouting composition of the present invention ranges from 30-mesh size (600 micrometer) to 100-mesh size (150 micrometer).

EXAMPLE 6

The grouting composition of the present invention contains neither environmentally objectional substances nor organic compounds such as synthetic polymers. Table 9 shows the toxicity characteristics leaching procedure (TCLP) list of the grout prepared from the grouting composition of the present invention.

In understanding the present invention, it has been previously described herein that the prior art has typically used either a synthetic polymer as a clay thinner, or sometimes has merely added a deflocculant to the clay to reduce the slurry viscosity. However, in a marked departure from the prior art, the present invention uses a clay stabilizer to produce clay thinning. Swelling clays are disordered microcrystals of layered aluminosilicates with defect structures. Each clay layer unit consists of octahedral silicates layers. The silicate surfaces of the microcrystals have net negative charges because of isomorphous substitution ih the octahedral; the substitution is predominately iron or magnesium for aluminum in the octahedral or middle layer, which produces a negative charge at the surface. The charges are balanced by positive ions, usually sodium and calcium adsorbed to the surface. Certain cations such as ammonium ($NH_4^+$) and potassium ($K^+$) cations in solution exchange with the accessible cations on the clay surface. The strong interaction of ammonium or potassium cations with the surface of a clay reduces the hydration energy of the swelling clay, thus limiting but not ceasing its ability to swell. Therefore, more swellable clay can be added into freshwater to provide higher solids content of grouting slurry, and more significantly, to extend working time before the slurry begins to set up. The "clay stabilizer" is thus a slurry component which exchanges its cations with the cations in the clay lattice to thereby thin the viscous clay slurry, an example of such a clay stabilizer being granular ammonium sulfate.

Moreover, unlike the prior art, the present invention involves only one inorganic compound, i.e. ammonium sulfate, not a multiple component mixture, in conjunction with the bentonitic clay and the sepiolite. Furthermore, in the present invention, the inorganic clay dispersant (clay stabilizer) is directly incorporated with the granular sodium-based bentonitic clay. The grouting composition in the present invention can be directly mixed with freshwater to provide a desirable grouting slurry in one step, thus making the present grouting composition easier to use than that of the prior art.

The foregoing disclosure and description of the invention is illustrative and explanatory thereof, and various changes in the method steps as well as in the details of the grouting composition may be made within the scope of the appended claims without departing from the spirit of the invention.

Tables 1-9 discussed above follow hereinafter.

TABLE 1

GROUT COMPOSITION EVALUATION CRITERIA

| | $R_1$: Slurry viscosity reading vs mixing time | | | | $R_2$: Slurry shear strength profile | | | | $R_3$: Observation of grout slurry during mixing |
|---|---|---|---|---|---|---|---|---|---|
| Readings | 5 min | 20 min | 40 min | 60 min | Lbs/100 ft∧2 | 1 day | 7 day | Good | pumpable slurry; good consistency (no settling); structural stability; firm texture or structure; extended set time |
| Upper limit (thick) | 500 | 700 | 900 | 1000 | Minimum | 400 | 1000 | Poor | fluid-like (too thin); foaming (air entrapment); unstructural slurry (thin); excessive viscous slurry (too thick); premature set up (too thick) |
| Lower limit (thin) | 300 | 400 | 500 | 600 | Maximum | none | none | Fair | somewhere between "good" and "poor" |

TABLE 2

EVALUATION OF GROUT COMPOSITIONS AND SLURRY CHARACTERISTICS BY VISCOSITY PROFILE AS A FUNCTION OF MIXING TIME

| Grout Number | Point Reference (refer to FIG. 2) | Components Weight Percent of Each Grout Composition A, % | B, % | C, % | Grout Slurry Concentration (30% total solids) Grout, pounds | Water, gallons | Slurry Viscosity Reading vs Mixing Time in minutes 5 min | 20 min | 40 min | 60 min | Observation of Grout Slurry Characteristics and Performance Rating |
|---|---|---|---|---|---|---|---|---|---|---|---|
| 1 | 1 | 40 | 30 | 30 | 35.7 | 10 | 90 | 110 | 110 | 110 | Poor - fluid-like with foaming problem |
| 2 | 2 | 60 | 20 | 20 | 35.7 | 10 | 100 | 100 | 105 | 110 | Poor - fluid-like with foaming problem |
| 3 | 3 | 60 | 30 | 10 | 35.7 | 10 | 275 | 280 | 280 | 280 | Poor - thin slurry with foaming problem |
| 4 | 4 | 70 | 20 | 10 | 35.7 | 10 | 300 | 280 | 280 | 300 | Poor - thin slurry and weak set up |
| 5 | 5 | 80 | 10 | 10 | 35.7 | 10 | 200 | 250 | 300 | 325 | Poor - thin slurry and weak set up |
| 6 | 6 | 85 | 5 | 10 | 35.7 | 10 | 100 | 125 | 130 | 140 | Poor - fluid-like with tendency of trapping air |
| 7 | 7 | 90 | 5 | 5 | 35.7 | 10 | 550 | 750 | 900 | 1050 | Good - viscous slurry with good consistency |
| 8 | 8 | 90 | 0 | 10 | 35.7 | 10 | 140 | 150 | 150 | 160 | Poor - fluid-like with tendency of trapping air |
| 9 | 9 | 95 | 0 | 5 | 35.7 | 10 | 600 | 900 | 1075 | 1200 | Poor - viscous slurry with short set time |
| 10 | 10 | 80 | 16 | 4 | 35.7 | 10 | 900 | 1150 | 1350 | 1500 | Poor - excessive viscous slurry hard to pump |
| 11 | 11 | 84 | 8 | 8 | 35.7 | 10 | 225 | 260 | 325 | 375 | Fair - pumpable thin slurry |
| 12 | 12 | 86 | 7 | 7 | 35.7 | 10 | 300 | 350 | 400 | 450 | Good - pumpable slurry with good consistency |
| 13 | 13 | 88 | 6 | 6 | 35.7 | 10 | 350 | 475 | 550 | 650 | Good - pumpable slurry with good consistency |
| 14 | 14 | 88 | 7 | 5 | 35.7 | 10 | 400 | 650 | 750 | 875 | Good - pumpable slurry with good consistency |

TABLE 3

EVALUATION OF GROUT COMPOSITIONS AND SLURRY CHARACTERISTICS BY SHEAR STRENGTH PROFILE AS A FUNCTION OF TIME

| Grout No. | Point Reference (refer to FIG. 2) | Components Weight Percent of Each Grout Composition A, % | B, % | C, % | Grout Slurry Concentration (30% total solids) Grout, lbs. | Water, gal. | Slurry Shear Strength lbs/100 ft∧2, vs Time 1 day | 2 day | 3 day | 5 day | 7 day | Observation of Grout Slurry Characteristics and Performance Rating |
|---|---|---|---|---|---|---|---|---|---|---|---|---|
| 1 | 1 | 40 | 30 | 30 | 35.7 | 10 | <100 | <100 | <100 | <100 | <100 | Poor - thin and unstructural slurry |
| 2 | 2 | 60 | 20 | 20 | 35.7 | 10 | <100 | <100 | <100 | <100 | <100 | Poor - thin and unstructural slurry |
| 3 | 3 | 60 | 30 | 10 | 35.7 | 10 | <100 | <100 | <100 | <100 | <100 | Poor - thin and unstructural slurry |
| 4 | 4 | 70 | 20 | 10 | 35.7 | 10 | 110 | 100 | 100 | 125 | 125 | Poor - thin slurry with unstable structure |
| 5 | 5 | 80 | 10 | 10 | 35.7 | 10 | <100 | <100 | 125 | 140 | 155 | Poor - thin slurry with unstable structure |
| 6 | 6 | 85 | 5 | 10 | 35.7 | 10 | <100 | <100 | <100 | <100 | <100 | Poor than and unstructural slurry |
| 7 | 7 | 90 | 5 | 5 | 35.7 | 10 | 344 | 468 | 556 | 870 | 1015 | Good - grout with stable structure |
| 8 | 8 | 90 | 0 | 10 | 35.7 | 10 | <100 | <100 | <100 | <100 | <100 | Poor - thin and unstructural slurry |
| 9 | 9 | 95 | 0 | 5 | 35.7 | 10 | 500 | 625 | 1270 | 1500 | >1500 | Good - firm structure |
| 10 | 10 | 80 | 16 | 4 | 35.7 | 10 | 800 | 850 | 1425 | >1500 | >1500 | Good - firm texture but premature set-up |
| 11 | 11 | 84 | 8 | 8 | 35.7 | 10 | 115 | 137 | 162 | 210 | 220 | Poor - weak structural stability |

TABLE 3-continued
EVALUATION OF GROUT COMPOSITIONS AND SLURRY CHARACTERISTICS BY SHEAR STRENGTH PROFILE AS A FUNCTION OF TIME

| Grout No. | Point Reference (refer to FIG. 2) | Components Weight Percent of Each Grout Composition A, % | B, % | C, % | Grout Slurry Concentration (30% total solids) Grout, lbs. | Water, gal. | Slurry Shear Strength lbs/100 ft^2, vs Time 1 day | 2 day | 3 day | 5 day | 7 day | Observation of Grout Slurry Characteristics and Performance Rating |
|---|---|---|---|---|---|---|---|---|---|---|---|---|
| 12 | 12 | 86 | 7 | 7 | 35.7 | 10 | 120 | 150 | 170 | 200 | 210 | Poor - weak structural stability |
| 13 | 13 | 88 | 6 | 6 | 35.7 | 10 | 213 | 310 | 514 | 534 | 635 | Fair - moderate structural stability |
| 14 | 14 | 88 | 7 | 5 | 35.7 | 10 | 430 | 551 | 629 | 845 | 1100 | Good - grout with stable structure and an extended set time |

TABLE 4
SUMMARY OF GROUT COMPOSITION EVALUATION BY PRE-ESTABLISHED THREE CRITERIA

| Grout Number | Point Reference (refer to FIG. 2) | Components Weight Percent of Each Grout Composition A, % | B, % | C, % | Grout Slurry Concentration (30% total solids) Grout, pounds | Water, gallons | $R_1$: Viscosity criterion Between the upper and lower limits | $R_2$: Shear strength criterion Above the minimum requisite | $R_3$: Observation criterion Mixing for viscosity | Mixing for shear strength |
|---|---|---|---|---|---|---|---|---|---|---|
| 1 | 1 | 40 | 30 | 30 | 35.7 | 10 | NO | NO | POOR | POOR |
| 2 | 2 | 60 | 20 | 20 | 35.7 | 10 | NO | NO | POOR | POOR |
| 3 | 3 | 60 | 30 | 10 | 35.7 | 10 | NO | NO | POOR | POOR |
| 4 | 4 | 70 | 20 | 10 | 35.7 | 10 | NO | NO | POOR | POOR |
| 5 | 5 | 80 | 10 | 10 | 35.7 | 10 | NO | NO | POOR | POOR |
| 6 | 6 | 85 | 5 | 10 | 35.7 | 10 | NO | NO | POOR | POOR |
| 7 | 7 | 90 | 5 | 5 | 35.7 | 10 | YES | YES | GOOD | GOOD |
| 8 | 8 | 90 | 0 | 10 | 35.7 | 10 | NO | NO | POOR | POOR |
| 9 | 9 | 95 | 0 | 5 | 35.7 | 10 | NO | YES | POOR | GOOD |
| 10 | 10 | 80 | 16 | 4 | 35.7 | 10 | NO | YES | POOR | GOOD |
| 11 | 11 | 84 | 8 | 8 | 35.7 | 10 | NO | NO | FAIR | POOR |
| 12 | 12 | 86 | 7 | 7 | 35.7 | 10 | NO | NO | GOOD | POOR |
| 13 | 13 | 88 | 6 | 6 | 35.7 | 10 | YES | NO | GOOD | FAIR |
| 14 | 14 | 88 | 7 | 5 | 35.7 | 10 | YES | YES | GOOD | GOOD |

TABLE 5
$2^3$ FACTORIAL DESIGN CALCULATING TOTAL EFFECT OF SLURRY VISCOSITY AND SHEAR STRENGTH BY EACH COMPONENT

| I | A | B | C | AB | AC | BC | ABC | Viscosity reading* | Shear strength* | Effect on slurry viscosity | Effect on slurry shear strength | Effect identification |
|---|---|---|---|---|---|---|---|---|---|---|---|---|
| + | − | − | − | + | + | + | − | 575 | 447 | 591 (average) | 296 (average) | Average |
| + | + | − | − | − | − | + | + | 1150 | 682 | 251 (increase) | 60 (increase) | A (primary) |
| + | − | + | − | − | + | − | + | 915 | 470 | 159 (increase) | −32 (minor) | B (primary) |
| + | + | + | − | + | − | − | − | 1275 | 500 | −776 (decrease) | −459 (decrease) | C (primary) |
| + | − | − | + | + | − | − | + | 145 | 63 | −51 (minor) | −53 (decrease) | AB (secondary) |
| + | + | − | + | − | + | − | − | 175 | 53 | −216 (decrease) | −73 (decrease) | AC (secondary) |
| + | − | + | + | − | − | + | − | 225 | 82 | −74 (minor) | 48 (minor) | BC (secondary) |
| + | + | + | + | + | + | + | + | 265 | 67 | 56 (minor) | 50 (minor) | ABC (minor) |
| (8) | (4) | (4) | (4) | (4) | (4) | (4) | (4) | (divisor) | | | | |

*Viscosity reading was obtained from Fann 35A rheometer with torsion spring of 5 after grout slurry was mixed for 20 minutes.
*Shear strength was obtained on each grout slurry after curred for one day.
*Each grout slurry contained 30% of total solids.
Component
A: granular bentonite
B: sepiolite
C: ammonium slat
Range
High (+)  Low (−)
80%       70%
12%       6%
8%        4%

TABLE 6
HYDRAULIC CONDUCTIVITY DETERMINATION* OF GROUT COMPOSITION

| Duration of test, day | Hydraulic conductivity, cm/sec | Duration of test, day | Hydraulic conductivity, cm/sec | Duration of test, day | Hydraulic conductivity cm/sec |
|---|---|---|---|---|---|
| 1 | $1.27 \times 10^{-7}$ | 9 | $2.91 \times 10^{-8}$ | 18 | $1.93 \times 10^{-8}$ |

TABLE 6-continued

HYDRAULIC CONDUCTIVITY DETERMINATION* OF GROUT COMPOSITION

| Duration of test, day | Hydraulic conductivity, cm/sec | Duration of test, day | Hydraulic conductivity, cm/sec | Duration of test, day | Hydraulic conductivity cm/sec |
|---|---|---|---|---|---|
| 2 | $7.77 \times 10^{-8}$ | 11 | $2.41 \times 10^{-8}$ | 20 | $1.92 \times 10^{-8}$ |
| 3 | $6.23 \times 10^{-8}$ | 12 | $2.35 \times 10^{-8}$ | 25 | $1.43 \times 10^{-8}$ |
| 5 | $4.41 \times 10^{-8}$ | 13 | $2.21 \times 10^{-8}$ | 28 | $1.49 \times 10^{-8}$ |
| 7 | $3.53 \times 10^{-8}$ | 15 | $2.17 \times 10^{-8}$ | 32 | $1.53 \times 10^{-8}$ |

*Hydraulic conductivity determination was conducted under the following conditions:
Method: constant head with fixed-wall cell
Permeant fluid: tap water
Hydrostatic head: 23.1 feet water head
Compaction: none (free flow)
Grout slurry: 3" (diameter) and 2" (thickness)

TABLE 7

SELECTION OF CLAY STABILIZERS FOR THE GROUTING COMPOSITION
Each of the following grouting compositions contains (1) component A - 88% by weight granular bentonite, (2) component B - 7% by weight sepiolite, and (3) component C - 5% by weight clay stabilizer.*

| Clay Stabilizers* (Ammonium and Potassium salts) | Grout Slurry Concentration (30% total solids) | | Slurry Viscosity Reading vs Mixing Time in minutes | | | | $R_1$: Viscosity criterion Between the upper and lower limits | $R_3$: Observation criterion Grout slurry characteristics and performance rating |
|---|---|---|---|---|---|---|---|---|
| | Grout, pounds | Water, gallons | 5 min | 20 min | 40 min | 60 min | | |
| Ammonium Acetate | 35.7 | 10 | 205 | 285 | 300 | 315 | NO | POOR - thin slurry, poorly dispersed |
| Ammonium Phosphate | 35.7 | 10 | 1000 | 1485 | >1500 | >1500 | NO | POOR - excessive viscous slurry (too thick) |
| Ammonium Carbonate | 35.7 | 10 | 95 | 125 | 115 | 120 | NO | POOR - fluid-like thin slurry |
| Ammonium Chloride | 35.7 | 10 | 75 | 125 | 120 | 125 | NO | POOR - fluid-like thin slurry |
| Ammonium Sulfate, granular | 35.7 | 10 | 400 | 650 | 750 | 875 | YES | GOOD - good consistency and pumpable |
| Ammonium Sulfate, fine | 35.7 | 10 | 315 | 370 | 400 | 450 | NO | FAIR - good consistency but thin slurry |
| Potassium Carbonate | 35.7 | 10 | 185 | 200 | 220 | 220 | NO | POOR - fluid-like thin slurry |
| Potassium Acetate | 35.7 | 10 | 360 | 365 | 405 | 415 | NO | FAIR - good consistency but thin slurry |
| Potassium Chloride | 35.7 | 10 | 215 | 255 | 280 | 300 | NO | POOR - fluid-like thin slurry |
| Potassium Biphthalate | 35.7 | 10 | 1100 | 1250 | 1240 | 1250 | NO | POOR - thick slurry with short set-time |

TABLE 8

SELECTION OF SODIUM BENTONITE CLAY PARTICLE SIZE DISTRIBUTION FOR THE GROUTING COMPOSITION
Each of the following grouting compositions contains (1) component A - 88% by weight water swellable sodium bentonite clay with different particle size distribution ranges*, (2) component B - 7% by weight sepiolite, and (3) component C - 5% by weight ammonium sulfate clay stabilizer.

| Sodium bentonite clay with varying particle size distribution ranges* | Grout Slurry Concentration (30% total solids) | | Slurry Viscosity Reading vs Mixing Time in minutes | | | | $R_1$: Viscosity criterion Between the upper and lower limit | $R_3$: Observation criterion Grout slurry characteristics performance rating |
|---|---|---|---|---|---|---|---|---|
| | Grout, pounds | Water, gallons | 5 min | 20 min | 40 min | 60 min | | |
| Less than 200 mesh size - finely divided clay | 35.7 | 10 | >1500 | >1500 | >1500 | >1500 | NO | POOR - extremely thick slurry |
| Between 100 mesh to 30 mesh - fine granular | 35.7 | 10 | 400 | 650 | 750 | 875 | YES | GOOD - good consisstency with an extended working time |
| Between 35 mesh to 16 mesh - medium granular | 35.7 | 10 | 465 | 555 | 600 | 625 | YES | GOOD - good consistency but slightly thinner than the above slurry |
| Between 16 mesh to 10 mesh - large granular | 35.7 | 10 | 85 | 90 | 90 | 90 | NO | POOR - fluid-like thin slurry |
| Between 10 mesh to 8 mesh - extra large granular | 35.7 | 10 | 70 | 70 | 75 | 125 | NO | POOR - thin slurry and foamy (air bubbles) |

TABLE 9

TOXICITY CHARACTERISTICS LEACHING PROCEDURE (TCLP)* LIST OF THE GROUT FROM THE GROUTING COMPOSITION

| EPA HWY NUMBER | CONTAMINANT | METHOD NUMBER | CAS NUMBER | RESULT, MG/L or PPM | REGULATORY LEVEL, MG/L | DETECTION LIMIT, MG/L |
|---|---|---|---|---|---|---|
| D004 | Arsenic | SW846-6010 | 7440-38-2 | 0.32 | 5.00 | 0.1 |
| D005 | Barium | SW846-6010 | 7440-39-3 | 0.12 | 100.00 | 0.1 |
| D006 | Cadmium | SW846-6010 | 7440-43-9 | not found | 1.00 | 0.1 |
| D007 | Chromium | SW846-6010 | 7440-47-3 | not found | 5.00 | 0.1 |
| D008 | Lead | SW846-6010 | 7439-92-1 | 0.12 | 5.00 | 0.1 |
| D009 | Mercury | SW846-7471 | 7439-97-6 | not found | 0.20 | 0.01 |
| D010 | Selenium | SW846-6010 | 7782-49-2 | 0.1 | 1.00 | 0.1 |

TABLE 9-continued

TOXICITY CHARACTERISTICS LEACHING PROCEDURE (TCLP)* LIST OF THE GROUT FROM THE GROUTING COMPOSITION

| EPA HWY NUMBER | CONTAMINANT | METHOD NUMBER | CAS NUMBER | RESULT, MG/L or PPM | REGULATORY LEVEL, MG/L | DETECTION LIMIT, MG/L |
|---|---|---|---|---|---|---|
| D011 | Silver | SW846-6010 | 7440-22-4 | not found | 5.00 | 0.1 |

*The TCLP data was obtained by the Microbiological and Biochemical Assay Laboratory (M.B.A.) at Houston, Texas (Federal Register Vol. 55, No. 61 March 29, 1990).

What is claimed is:

1. A pumpable, reswellable grouting composition mixable with water for sealing an earthen borehole or other subsurface cavity, consisting of 88–90% by weight of granular sodium bentonite, 6–7% by weight of finely ground sepiolite, and 4–5% by weight of granular ammonium sulfate.

2. A pumpable, reswellable grouting slurry or admixture comprising 50 pounds of a preblended grouting composition consisting of 88–90% by weight of granular sodium bentonite, 6–7% by weight of finely ground sepiolite, and 4–5% by weight of granular ammonium sulfate, mixed with 13–14 gallons of freshwater, wherein the resultant grouting admixture contains 30–32% by weight of active, reswellable solids.

3. The grouting admixture of claim 2 comprising a total of 30–32% by weight of active, reswellable solids with a density of 10.1–10.3 pounds per gallon.

4. The method of forming a grout seal in an annulus between a conduit and the borehole wall of an earthen borehole, comprising the steps of:
   adding a preblended grouting composition consisting of 88–90% by weight of granular sodium bentonite, 6–7% by weight of finely ground sepiolite, and 4–5% by weight of granular ammonium sulfate to 13–14 gallons of fresh water;
   agitating the admixture while adding the preblended grouting composition until at least 50% of the composition is fully dispersed;
   pumping the admixture into the annulus between the conduit and the borehole wall, and permitting said grouting composition to set.

5. The method according to claim 4, wherein the grouting admixture is an unflocculated, fully reswellable and homogeneous slurry, and comprises about 30–32% by weight of active, reswellable solids.

* * * * *